United States Patent Office.

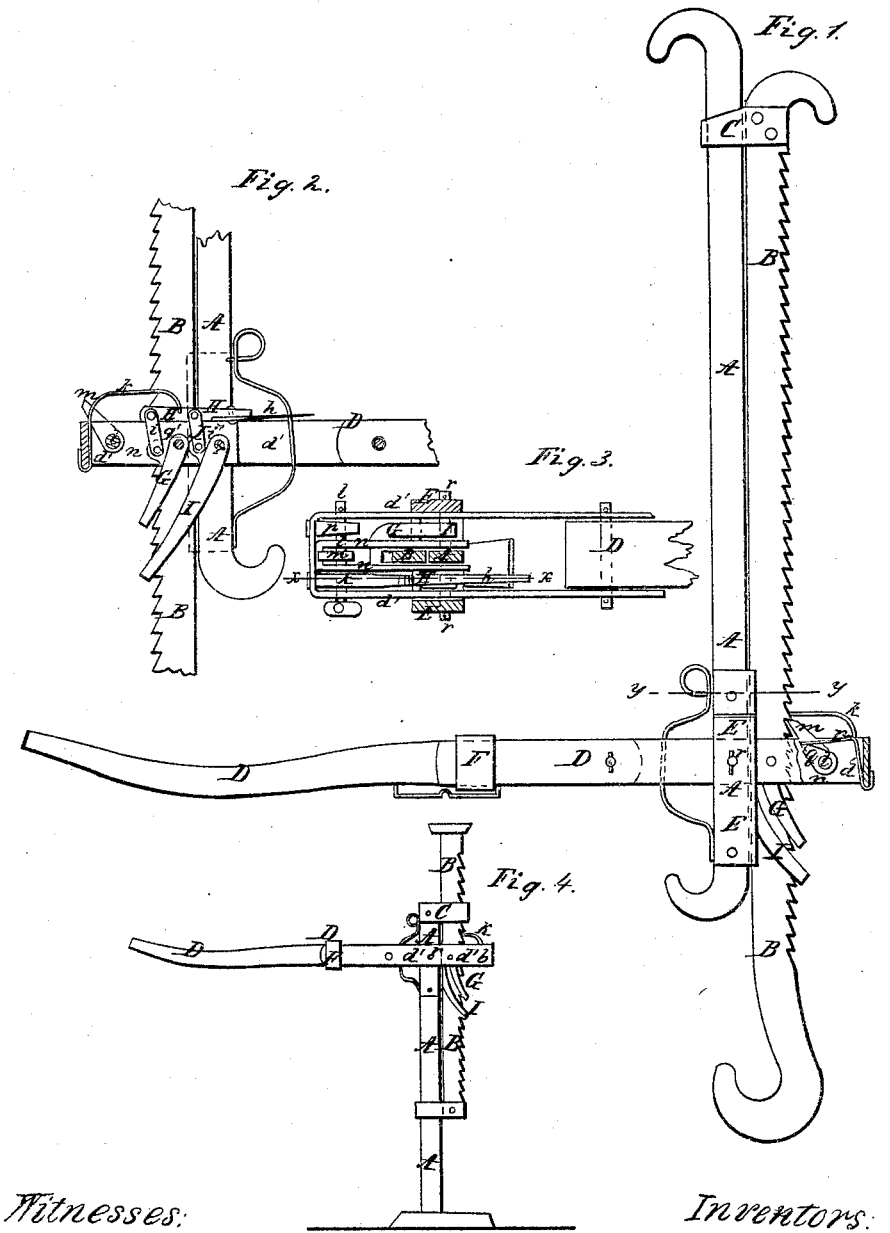

GEORGE L. AND WILLIAM M. HOWLAND, OF TOPSHAM, MAINE.

Letters Patent No. 63,251, dated March 26, 1867.

IMPROVEMENT IN HOISTING APPARATUS.

*The Schedule referred to in these Letters Patent and making part of the same.*

TO ALL WHOM IT MAY CONCERN:

Be it known that we, GEORGE L. HOWLAND and WILLIAM M. HOWLAND, of Topsham, Sagadahoc county, Maine, have invented a new and improved Hoisting Apparatus; and we do hereby declare that the following is a full, clear, and exact description thereof, which will enable others skilled in the art to make and use the same, reference being had to the accompanying drawings, forming part of this specification.

This invention consists in certain improvements on the hoisting apparatus for which Letters Patent were granted to GEORGE L. HOWLAND on the 18th day of September, A. D. 1866. The improvement consists in the use of a third pawl, whereby the notched bar may be raised two or more teeth at a time, which pawl can be easily thrown out of gear to let the device operate, as described in the said Letters Patent. The improvements further consist in making the connections between the lower pawls more flexible by the application of one more link, whereby the operation will be easier, and a less amount of power required. In the accompanying drawings our invention is illustrated—

Figure 1 being a side view, partly in section, of our improved hoisting apparatus.

Figure 2 is a detail sectional view of the same, taken on the line $x\,x$, fig. 3.

Figure 3 is a horizontal sectional view of the same, taken on the line $y\,y$, fig. 1, and Figure 4 is a side elevation of our device, when modified so as to be used as a wagon-jack.

Similar letters of reference indicate corresponding parts.

The hanging-bar A, notched bar B, clasp C, lever D, guide-braces E, band F, and pawls G and I, are substantially the same as those described in the aforesaid Letters Patent. The lever H, the rear end of which terminates in a spring, $h$, is not, as in the aforesaid Letters Patent, pivoted directly to the arm $g'$ of the pawl G, but to the upper end of a vertical rod, $i$, the lower end of which is pivoted to the arm $g'$, as shown in fig. 2. More elasticity of the parts is thus provided, and a more easy and complete operation is secured. The spring $h$, at the near end of the lever H, is not made part of the said lever, but is riveted or otherwise secured to the same, so as to be easily replaced when broken or injured. The spring K is attached, and made like the one in the said patent, with the exception of its rear end, which is not bent so as to rest upon the lever H, but fits into a notch in said lever, as shown. The friction between H and K will thus be avoided. A pin, $l$, which passes through both wings of the metallic band $d'$, which forms the front part of the handle or lever D, and in front of the notched bar B, is provided with a pawl, $m$, secured firmly to it, and fitting into the notches in the bar B, above its pivoting-point $l$, as shown. A band, $n$, is arranged immediately around the bars A and B and pawl $m$, for the purpose of keeping the latter in place. To one end of the pin $l$ is attached a knob, $o$, for the purpose of easily turning the pin and throwing the pawl $m$ in or out of gear, as may be desired. The pin is held in either position by a spring, $p$, which is secured to $d'$ in a similar manner as the spring K, and which presses upon an eccentric-arm, $g$, as shown in fig. 1, the said eccentric-arm being secured to the pin $l$, and revolving with the same. The pawl $m$ and appendages are arranged for the purpose of getting a larger stroke for the rod B; and the further the pin $l$ is set from the pivot $r$ of the bar A and lever D, the more teeth will be skipped during each up and down movement of the lever D. Instead of suspending the bar A and hoisting a weight which is attached to the lower end of bar B, the device may be used with a bar, A, which stands on the ground, (fig. 4,) a weight being raised which rests on the top of bar B, in which case the apparatus may be used as wagon-jack, or for similar purposes. It would not require a great change of the device, if, instead of the rod B, a ratchet-wheel should be used; the main points of the mechanism would remain the same.

We claim as new, and desire to secure by Letters Patent—

1. The pawls G and I, arms $g'$ and $i'$, and links $i$ and J, in combination with the spring-lever H, bars A and B, and lever D, all made and operating substantially as herein shown and described.

2. The pawl $m$, in combination with the pawls G and I, and with the bar B, substantially as and for the purpose herein shown and described.

3. The pin $l$, and pawl $m$, in combination with the band $n$, arm $g$, and spring $p$, all made and operating substantially as set forth.

GEORGE L. HOWLAND,
WILLIAM M. HOWLAND.

Witnesses:
WARREN W. GOUD,
EUGENE SMALL.